United States Patent [19]

Hattori et al.

[11] 4,210,111

[45] Jul. 1, 1980

[54] ELECTRONIC IGNITION CONTROL METHOD AND APPARATUS

[75] Inventors: Tadashi Hattori, Okazaki; Mamoru Kobashi, Aichi; Toru Kawase, Toyota; Yoshiki Ueno, Okazaki, all of Japan

[73] Assignees: Nippon Soken, Inc., Nishio; Toyota Jidosha Kogyo Kabushiki Kaisha, Toyota, both of Japan

[21] Appl. No.: 872,778

[22] Filed: Jan. 27, 1978

[30] Foreign Application Priority Data

Feb. 1, 1977 [JP] Japan .................................. 52/10385

[51] Int. Cl.² .............................................. F02D 5/04
[52] U.S. Cl. ..................................... 123/414; 123/416
[58] Field of Search .......... 123/117 R, 117 D, 32 EB, 123/32 EC

[56] References Cited

U.S. PATENT DOCUMENTS

| | | | |
|---|---|---|---|
| 3,927,648 | 12/1975 | Kawai et al. | 123/117 D X |
| 3,998,193 | 12/1976 | Ives et al. | 123/117 D |
| 4,051,822 | 10/1977 | Yoshida | 123/117 D |
| 4,052,967 | 10/1977 | Colling et al. | 123/117 D |
| 4,081,995 | 4/1978 | Griffith et al. | 123/117 D X |
| 4,112,887 | 9/1978 | Chateau | 123/117 D |

Primary Examiner—Tony M. Argenbright
Attorney, Agent, or Firm—Cushman, Darby & Cushman

[57] ABSTRACT

An electronic ignition control apparatus for an engine comprises a reference signal generator to produce a reference signal corresponding to the top dead center position of a piston, a first sensor to produce a first output signal indicative of the amount of air sucked into a combustion chamber of the engine, a second sensor to produce a second output signal indicative of a predetermined period of time necessary for generating a spark voltage in an ignition coil, and a memory circuit to store a data indicating an optimum period of time for spark advance in relation to the amount of sucked air and responsive to the reference signal to produce a third output signal indicative of a period of time for spark advance relative to the first output signal, a calculation circuit responsive to the reference signal to calculate a timing to start energization of the primary winding of the ignition coil in the following cycle of the reference signal with respect to each period of time represented by the second and third output signals, and a setting circuit responsive to a timing signal indicative of a calculation-resultant value to maintain the energization of the primary winding of the ignition coil within the predetermined period of time.

8 Claims, 6 Drawing Figures

ELECTRONIC IGNITION CONTROL METHOD AND APPARATUS

BACKGROUND OF THE INVENTION

The present invention relates to an electronic control method and apparatus for internal combustion engines, and more particularly to an electronic ignition control method and apparatus of the type including a calculation circuit to calculate optimum timing of sparks supplied to the engine in accordance with changes of the operating condition of the engine.

In conventional electronic ignition control devices of the type, generally negative pressure in the intake manifold and rotation speed of the engine are electrically detected to calculate optimum engine spark timing. The spark timing is controlled by an output signal indicative of optimum spark advance which is calculated from detected signals indicative of the negative pressure and the rotation speed. Furthermore, a predetermined period of time necessary for energization of an ignition coil primary winding is considered as a factor in the factor in the calculation to set optimum spark timing. This means that the calculation is very complicated and at least two detecting elements for detecting changes of the operating condition of the engine are required.

SUMMARY OF THE INVENTION

It is, therefore, a primary object of the present invention to provide an electronic ignition control apparatus wherein the amount of air sucked into the engine is detected to calculate optimum spark timing taking into account a predetermined period of time necessary for energization of the primary winding of an ignition coil, thereby to simplify the calculation. a predetermined period of time necessary for energization of the primary winding of an ignition coil, thereby to simplify the calculation.

Figure 1:
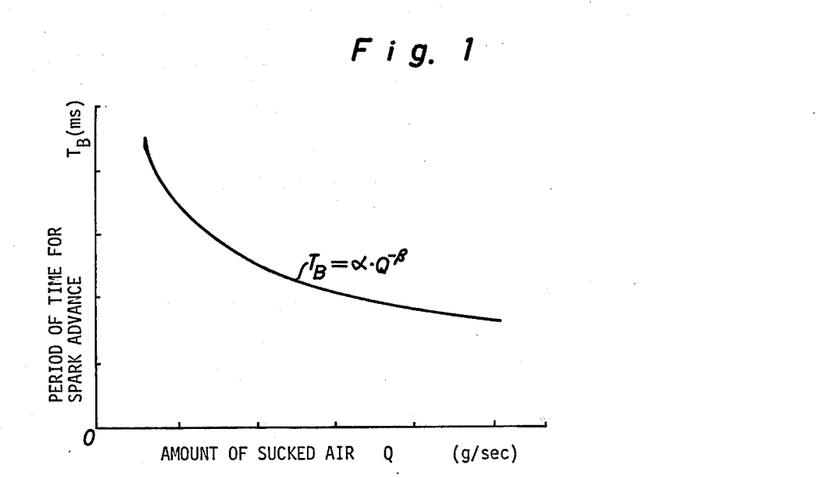
FIG. 1 depicts a graph of the spark advance in $T_B$ relation to an amount Q of air sucked into an internal combustion engine.

For an actual practice of the present invention, To practice the present invention, data indicating the optimum spark advance for the amount of air sucked into the engine was equation (1), as shown in FIG. 1.

$$T_B = \alpha \cdot Q^{-\beta} \tag{1}$$

Where $T_B$ is the optimum spark advance, Q is the amount of air sucked into the engine, Q is the amount of air sucked into the engine, $\alpha$ is a positive parameter varying in accordance with the air to fuel ratio, and $\beta$ is a positive parameter maintained in a in a constant in spite of changes in the air to fuel ratio. In this case, the optimum spark advance $T_B$ is the time interval between the fuel ignition and arrival of the piston to its top dead center position.

To examine adaptability of equation (1), the inventors have analyzed the following theoretical equation (2) in detail:

$$\tau = \frac{A}{[F]^n \cdot [O]^m} \cdot \exp(\frac{E}{RT_0}) \tag{2}$$

where $\tau$ is a variable indicative of the time lag in combustion of the air-fuel mixture,
A is a proportional constant,
E is a variable indicative of activation energy,
R is a gas constant,
$T_0$ is a temperature value of the air-fuel mixture upon ignition in the engine,
[F] is a variable indicative of the molarity of the fuel,
[O] is a variable indicative of the molarity of Oxygen, and
m and n are orders of reaction.

Meanwhile, it is in general well-known that ignition timing should be advanced in accordance within speed of the engine and the negative pressure in the intake manifold to compensate for the time lag in combustion of the air-fuel mixture. It has been presumed by the inventors that the time lag in combustion corresponds with time lag in ignition of air-fuel mixture in the equation (2) and also molarity [O] of Oxygen in the equation (2) corresponds with the amount Q of sucked air in the equation (1). Thus, in the equations (1) and (2), $\tau$ and $\{A/[F]^n\} \cdot \exp(E/RT_0)$ correspond respectively with $T_B$ and $\alpha$, and [O] and m correspond respectively with Q and $\beta$. As a result, it will equation (1) corresponds with theoretical equation (2).

According to the present invention, there is provided an electronic ignition control apparatus for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of the engine so as to operate the piston, the control apparatus comprising:

a reference signal generator for producing a reference signal corresponding to the top dead center position of the piston;

first means for producing a first digital output signal indicative of the amount of air sucked into the combustion chamber;

second means for producing a second digital output signal indicative of a predetermined period of time necessary for generating the spark voltage in the ignition coil;

memory means for storing a data indicating an optimum period of time for spark advance in relation to the amount of sucked air, the memory means being responsive to the reference signal for producing a third digital output signal indicative of a period of time for spark advance relative to the first output signal;

a calculation circuit responsive to the reference signal for calculating a timing to start the energization of the primary winding of the ignition coil in the following cycle of the reference signal with respect to each period of time represented by the second and third output signals, the calculation circuit producing a timing signal indicative of a calculation-resultant value; and fourth means responsive to the timing signal for maintaining electric power supply from a source of electricity to the primary winding of the ignition coil within the predetermined period of time corresponding to the second output signal.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 2:
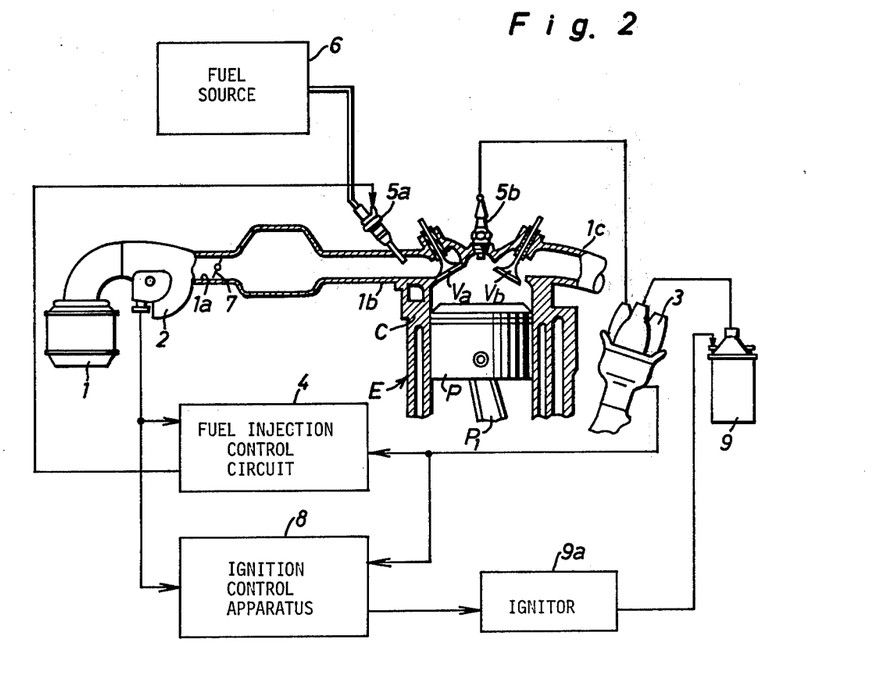
FIG. 2 is a schematic block diagram of an electronic control system for the engine including an electronic ignition control apparatus in accordance with the present invention.

Referring now to the accompanying drawings, in particular to FIG. 2 there is illustrated a schematic block diagram of an electronic control system for an internal combustion engine E including an electronic ignition control apparatus 8 in accordance with the present invention.

The engine E is of a conventional four cylinder, four stroke type and comprises a piston P reciprocable within each cylinder C. The piston P is connected by way of a connecting rod $P_1$ to a crankshaft (not shown) to produce rotation of the crankshaft in response to reciprocation thereof. The engine E also comprises four fuel injectors 5a mounted on an intake manifold 1b and four spark plugs 5b mounted on a cylinder head. Each fuel injector 5a is activated by receiving each electric signal from a fuel injection control circuit 4 to supply fuel from a fuel source 6 into the cylinder C. Each spark plug 5b is energized by a spark voltage from a distributor 3 to ignite air-fuel mixture within the cylinder C. The distributor 3 is provided to distribute the spark voltage from an ignition coil 9 to each spark plug 5b at appropriate intervals. In operation of the engine E, when an intake valve $V_a$ opens, injected fuel from the fuel injector 5a is mixed with air flowing into an induction passage 1a through a throttle valve 7 from an air cleaner 1. The air-fuel mixture is compressed by an upward stroke of the piston P and then ignited by a spark produced by the spark plug 5b. Combustion of the air-fuel mixture takes place, releasing heat energy, which is converted into mechanical energy upon the power stroke of the piston P. At or near the end of the power stroke, an exhaust valve $V_b$ opens and the exhaust gases are discharged into an exhaust manifold 1c.

The electronic control system comprises an air flow meter 2 provided within the induction passage 1a and a reference signal generator 30 (see FIG. 3) provided within the distributor 3. The air flow meter 2 detects an amount of air sucked into the induction passage 1a from the air cleaner 1 to produce an electric signal in proportion to the amount of sucked air. The reference signal generator 30 produces four reference signals per each rotation of a cam-shaft driven by the crankshaft. The cam-shaft rotates once per two rotations of the crankshaft. The fuel injection control circuit 4 receives electric signals from the air flow meter 2, the reference signal generator 30 and other sensors (not shown) to optimize the amount of fuel injected by fuel injector 5a. The ignition control apparatus 8 receives the electric signals from the air flow meter 2 and the reference signal generator 30 to generate an optimum ignition timing signal, which is applied to an ignitor 9a to generate the spark voltage in the ignition coil 9.

Figure 3:
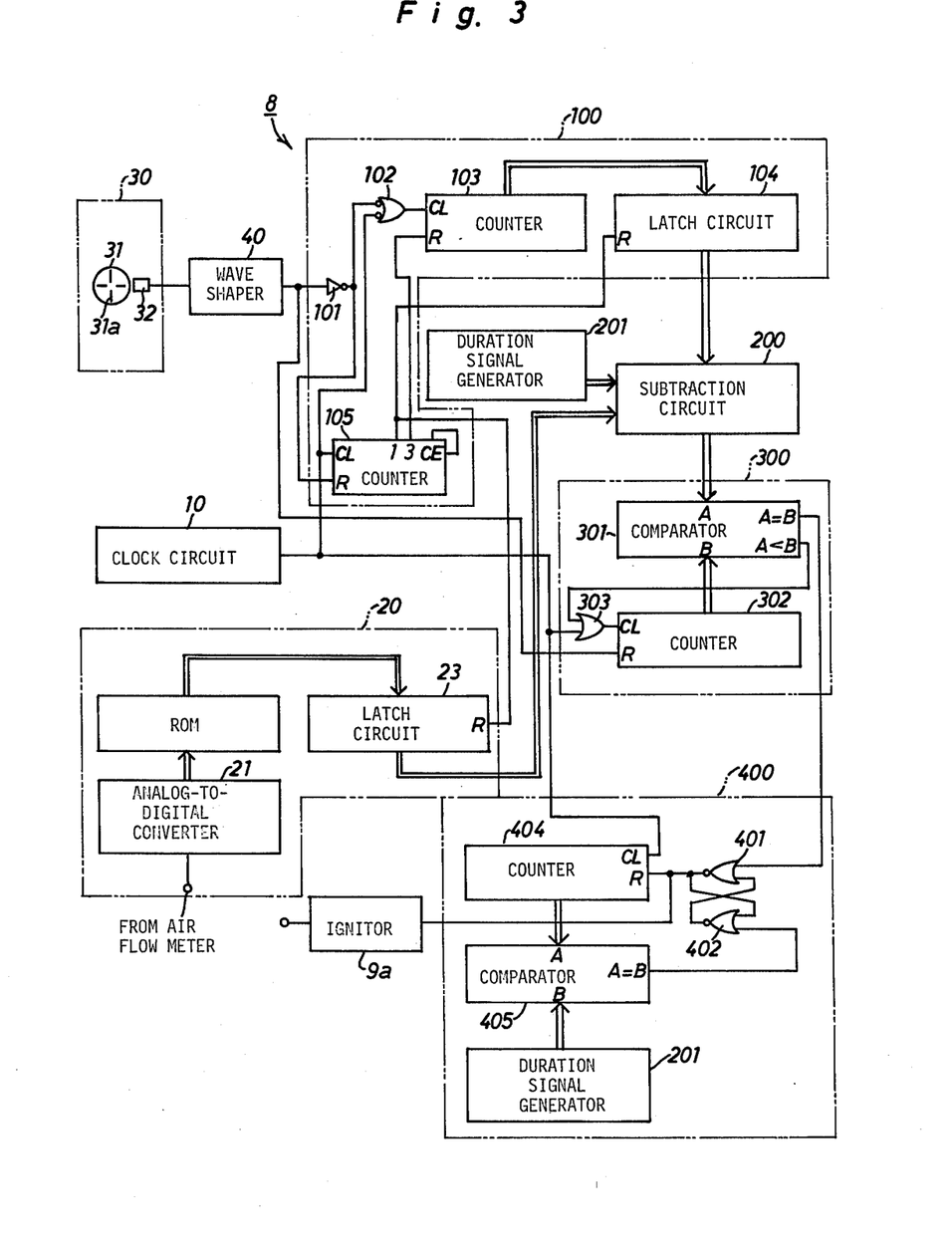
FIG. 3 is a circuit diagram of an embodiment of the ignition control apparatus illustrated in block form in FIG. 2.

In FIG. 3, there is illustrated an embodiment of the ignition control apparatus 8 which comprises a period-counting circuit 100 for receiving a reference signal from the reference signal generator 30 through a wave shaper 40. The reference signal generator 30 includes a disc 31 coupled to the cam-shaft, and a pair of optical elements 32 located in optic coupling relationship with the disc 31. The disc 31 is provided thereon with four slits 31a at each reference position corresponding with a top dead center position of each piston P. As the disc 31 rotates, the optical elements 32 detect each position of the slots 31a to produce a reference signal at a half crankshaft rotation, as shown in (a) of FIG. 4. The wave shaper 40 receives the reference signal therein to generate a reshaped rectangular pulse shown in (b) of FIG. 4. The rectangular pulse has a pulse-width $\tau_0$, which is predetermined regardless of engine rotation, and is synchronized at its leading edge with the reference signal in phase.

Figure 4:
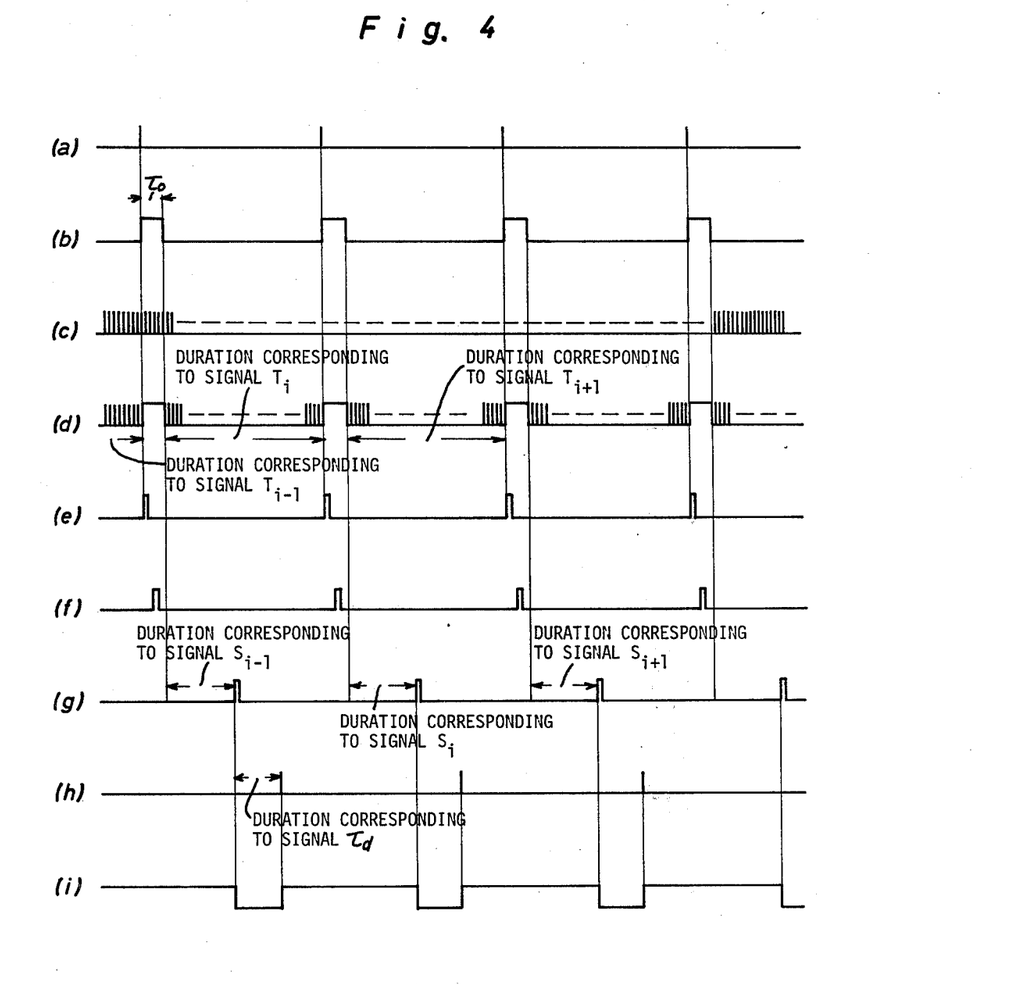
FIG. 4 illustrates waveforms obtained at various points in the control apparatus of FIG. 3.

The period-counting circuit 100 is designed to count clock pulses (See (c) of FIG. 4) from a clock circuit 10 responsive to the rectangular pulse from the wave shaper 40 and to generate a binary coded signal $T_i$ indicative of a cycle time of the rectangular pulse in response to a following rectangular pulse. The period-counting circuit 100 comprises an inverter 101 for inverting each rectangular pulse from the wave shaper 40 and a decade counter 105 of CD 4017 type manufactured by RCA Corporation in U.S.A. The counter 105 is reset upon receiving at its terminal R an inverter output pulse from the inverter 101 to count the clock pulses from the clock circuit 10 so as to generate at its output terminals denoted by digits 1 and 3 first and second reset pulses shown in (e) and (f) of FIG. 4. A NAND gate 102 receives at its input terminals the inverted output pulse from the inverter 101 and the clock pulses from the clock circuit 10 to generate at its output terminal a rectangular pulse with a pulse-width $\tau_0$ and sequential pulses, as shown in (d) of FIG. 4.

The period-counting circuit 100 comprises a latch circuit 104 for latching the binary coded signal $T_i$ from a binary counter 103 in response to a following first reset pulse from the counter 105, as described below. The counter 103 is reset upon receiving at its terminal R the second reset pulse from the counter 105 and counts the sequential pulses from NAND gate 102 with a lapse of time defined by the pulse-width $\tau_0$ to generate at its output terminal the bindary coded signal $T_i$. The latch circuit 104 is reset upon receiving at its terminal R the first reset pulse from the counter 105 and latches a binary coded signal $T_{i-1}$ previously counted in the counter 103. The latch circuit 104 transfers the latched signal $T_{i-1}$ to a subtraction circuit 200 at a trailing edge of the first reset pulse. When the latch circuit 104 is again reset upon receiving at its terminal R the following first reset pulse generated by the counter 105 in response to a following inverter output pulse from the inverter 101, it latches the binary coded signal $T_i$ and transfers the latched signal $T_i$ to the subtraction circuit 200 at a trailing edge of the following first reset pulse.

The ignition control apparatus 8 further comprises an operation circuit 20 for converting an electric signal from the air flow meter 2 to a binary coded signal $t_i$. In the operation circuit 20, an analog-to-digital converter 21 is provided to convert the electric signal of the air flow meter 2 into a binary electric signal, which is applied to an input terminal of a read-only memory or ROM. ROM previously stores therein the experimental data including the optimum period of time for spark advance in relation to the amount of sucked air detected by the air flow meter 2. In ROM, the binary coded signal $t_i$ is read out in accordance with the binary electric signal of the converter 21 by using the stored experimental data. A latch circuit 23 is reset upon receiving at its terminal R the following first reset pulse from the counter 105 and latches the binary coded signal $t_i$ from ROM. The latch circuit 23 transfers the latched signal $t_i$ to the subtraction circuit 200 at a trailing edge of the following first reset pulse.

The subtraction circuit 200 functions to subtract the binary coded signal $t_i$ of the latch circuit 23 and a binary coded signal $\tau_d$ of a duration signal generator 201 from the binary coded signal $T_i$ of the latch circuit 104. The generator 201 functions to generate the binary coded signal $\tau_d$ corresponding to a predetermined period of time for energizing the primary winding of the ignition coil 9. A subtraction-resultant value in the subtraction circuit 200 is applied as a binary coded signal $S_i$ to a timing signal generator 300 for starting energization of the primary winding of the ignition coil 9.

The generator 300 includes a comparator 301 for comparing the binary coded signal $S_i$ of the subtraction circuit 200 with a counted result of a binary counter 302. The counter 203 is reset upon receiving at its terminal R the rectangular pulse from the wave shaper 40 and counts output pulses from an OR gate 303. The comparator 301 receives at its terminals A and B the counted result from the counter 302 and the binary coded signal $S_i$ from the subtraction circuit 200 to compare them. In the comparator 301, while the counted result of the counter 302 is smaller than the binary coded signal $S_i$ of the subtraction circuit 200, the comparator 301 generates low level signals at its respective terminals $A=B$ and $A<B$. When the counted result becomes equal to the binary coded signal $S_i$, a timing signal shown in (g) of FIG. 4 appears at the terminal $A=B$ of the comparator 301. Thereafter, the counted result becomes larger than the binary coded signal $S_i$ so that the comparator 301 generates at its terminal $A<B$ a high level signal. The OR gate 303 receives at its input terminals the clock pulses from the clock circuit 10 and the low level signal appearing at the terminal $A<B$ of the comparator 301 to generate the output pulses at its output terminal. Thereafter, the OR gate 303 stops counting function of the counter 302 when it receives at one terminal thereof the high level signal appearing at the terminal $A<B$ of the comparator 301.

The ignition control apparatus 8 further comprises a setting circuit 400 for maintaining energization of the primary winding of the ignition coil 9 during the predetermined period of time defined by the binary coded signal $\tau_d$ of the duration signal generator 201. The circuit 400 comprises NOR gates 401 and 402 functioning as a flip-flop and a comparator 405 for comparing a counted result from a counter 404 with the binary coded signal $\tau_d$ from the duration signal generator 201. The counter 404 is reset upon receiving at its terminal R a low level signal from NOR gate 401 (See (i) of FIG. 4) to count the clock pulses from the clock circuit 10. The comparator 405 receives at its respective terminals A and B the counted result from the counter 404 and the binary coded signal $\tau_d$ from the duration signal generator 201. While the counted result from the counter 404 is smaller than the binary coded signal $\tau_d$ from the generator 201, the comparator 405 generates at its terminal $A=B$ a low level signal as shown in (h) of FIG. 4. When the counted result becomes equal to the binary coded signal $\tau_d$, the comparator 405 generates at its terminal $A=B$ a high level signal or output pulse as shown in (h) of FIG. 4.

NOR gate 401 receives at its input terminal the timing signal from the comparator 301 generate the low level signal at its output terminal. NOR gate 402 receives at its input terminal the high level signal from the comparator 405 so that NOR gate 401 generates at its output terminal a high level signal shown in (i) of FIG. 4. The ignitor 9a receives the low level signal from NOR gate 401 to energize the primary winding of the ignition coil 9. The ignitor 9a also receives the high level signal from NOR gate 401 as an ignition timing signal to deenergize the primary winding of the ignition coil 9 which generates the spark voltage therefrom at a leading edge of the high level signal. In addition, the counter 404 stops counting function thereof upon receiving at its terminal R the high level signal from NOR gate 401.

In operation, when one of the pistons P reaches its top dead center position during rotation of the engine E, the reference signal generator 30 produces a reference signal, as shown in (a) of FIG. 4, which is applied to the wave shaper 40. The reference signal is reshaped by the wave shaper 40 and then applied as a rectangular pulse (See (b) of FIG. 4) to the period-counting circuit 100 and the timing signal generator 300. In the period-counting circuit 100, the rectangular pulse from the wave shaper 40 is received and inverted by the inverter 101 into an output pulse which is applied to the first input terminal of NAND gate 102 and the reset terminal R of the counter 105. Then, the counter 105 is reset by the inverted output pulse of the inverter 101 and counts the clock pulses from the clock circuit 10 to generate first and second reset pulses at its output terminals, as shown in (e) and (f) of FIG. 4. The first reset pulse is applied to each reset terminal R of the latch circuits 104 and 23, and the second reset pulse is applied to the reset terminal R of the counter 103. Meanwhile, NAND gate 12 receives at its input terminals the inverted output pulse from the inverter 101 and the clock pulses from the clock circuit 10 to generate at its output terminal a rectangular pulse and sequential output pulses (See (d) of FIG. 4) which are applied to the terminal CL of the counter 103.

When the latch circuit 104 is reset by the first reset pulse from the counter 105, it latches a binary coded signal $T_{i-1}$ previously counted in the counter 103 and transfers the latched signal $T_{i-1}$ to the subtraction circuit 200 at a trailing edge of the first reset pulse. Then, the counter 103 is reset by the second reset pulse from the counter 105 and counts the sequential output pulses from NAND gate 102 with the lapse of time defined by the pulse-width $\tau_0$ to generate a binary coded signal $T_i$.

When another piston P reaches its top dead center position, the reference signal generator 30 produces a following reference signal which is applied to the wave shaper 40. The following reference signal is reshaped by the wave shaper 40 and applied as a following rectangular pulse to the period-counting circuit 100 and the timing signal generator 300. The inverter 101 receives and inverts the following rectangular pulse from the wave shaper 40 into an output pulse which is applied to NAND gate 102 and the counter 105. Then, the counter 105 is reset by the inverted output pulse of the inverter 101 and counts the clock pulses from the clock circuit 10 to generate following first and second reset pulses at its output terminals. The following first reset pulse is applied to the reset terminals R of the latch circuits 104 and 23, whereas the following second reset pulse is applied to the reset terminal R of the counter 103. Meanwhile, NAND gate 102 receives at its input terminals and inverted output pulse from the inverter 101 and the clock pulses from the clock circuit 10 to generate at its output terminal a following rectangular pulse and sequential output pulses which are applied to the terminal CL of the counter 103.

When the latch circuit 104 is reset by the following first reset pulse from the counter 105, the binary coded signal $T_i$ of the counter 103 is latched in the latch circuit 104 and transferred to the subtraction circuit 200 at a trailing edge of the following first reset pulse. Then, the counter 103 is reset by the following second reset pulse from the counter 105 and counts the following sequential output pulses from NAND gate 102 with the lapse of time previously described to generate a binary coded signal $T_{i+1}$.

Meanwhile, when the air flow meter 2 detects an amount of air sucked into the induction passage 1a during rotation of the engine E, it generates an electric signal in proportion to amount of the sucked air and applies the same to the analog-to-digital converter 21 of the operation circuit 20. The electric signal from the air flow meter 2 is converted by the converter 21 into a binary electric signal which is applied to ROM. Then, ROM reads out a binary coded signal $t_i$ in accordance with the binary electric signal from the converter 21 by using the stored experimental data. When the latch circuit 23 is reset by the following first reset pulse from the counter 105, it latches the binary coded signal $t_i$ and transfers the latched signal $t_i$ to the subtraction circuit 200.

In the subtraction circuit 200, the binary coded signals $t_i$ and $\tau_d$ of the latch circuit 23 and the duration signal generator 201 are subtracted from the binary coded signal $T_i$ of the latch circuit 104. The subtraction-resultant value is applied as a binary coded signal $S_i$ to the timing signal generator 300. At the same time, the counter 302 of the generator 300 is reset upon receiving the following rectangular pulse from the wave shaper 40 to count the output pulses from the OR gate 303. The comparator 301 receives at its terminals A and B the binary coded signal $S_i$ from the subtraction circuit 200 and a counted result from the counter 302 to compare them. When the counted result becomes equal to the binary coded signal $S_i$, the comparator 301 generates at its terminal A=B a high level signal which is applied to the setting circuit 400. This means that the high level signal from the generator 300 is applied to the setting circuit 400 as a timing signal for starting energization of the primary winding of the ignition coil 9 with a lapse of time corresponding to the binary coded signal $S_i$. In addition, when the counted result becomes larger than the binary coded signal $S_i$, the comparator 301 generates at its terminal A<B a high level signal which is applied to the input terminal of the OR gate 303. Then, the OR gate 303 generates at its output terminal a high level signal which is applied to the terminal CL of the counter 302 to stop counting function of the counter 302.

In the setting circuit 400, when NOR gate 401 receives at its input terminal the timing signal from the comparator 301, it generates at its output terminal a low level signal which is applied to the ignitor 9a and the counter 404. Then, the primary winding of the ignition coil 9 is energized by the ignitor 9a during the duration defined by the binary coded signal $\tau_d$ of the generator 201. Meanwhile, the counter 404 is released from a reset condition upon receiving at its terminal R the low level signal of NOR gate 401 to count the clock pulses from the clock circuit 10. The comparator 405 receives at its terminals A and B a counted result from the counter 404 and the binary coded signal $\tau_d$ from the duration signal generator 201 to compare them. When the counted result of the counter 404 becomes equal to the binary coded signal $\tau_d$ of the generator 201, the comparator 405 generates at its terminal A=B an output pulse shown in (h) of FIG. 4. Then, the NOR gate 402 receives at its input terminal the output pulse from the comparator 405 and inverts the low level signal of the NOR gate 401 into a high level signal which is applied to the counter 404 and the ignitor 9a. Subsequently, the high level signal from NOR gate 401 is applied as an ignition timing signal to the ignitor 9a which deenergizes the primary winding of the ignition coil 9. Thus, a spark voltage is generated at the secondary winding of the ignition coil 9.

Figure 5:
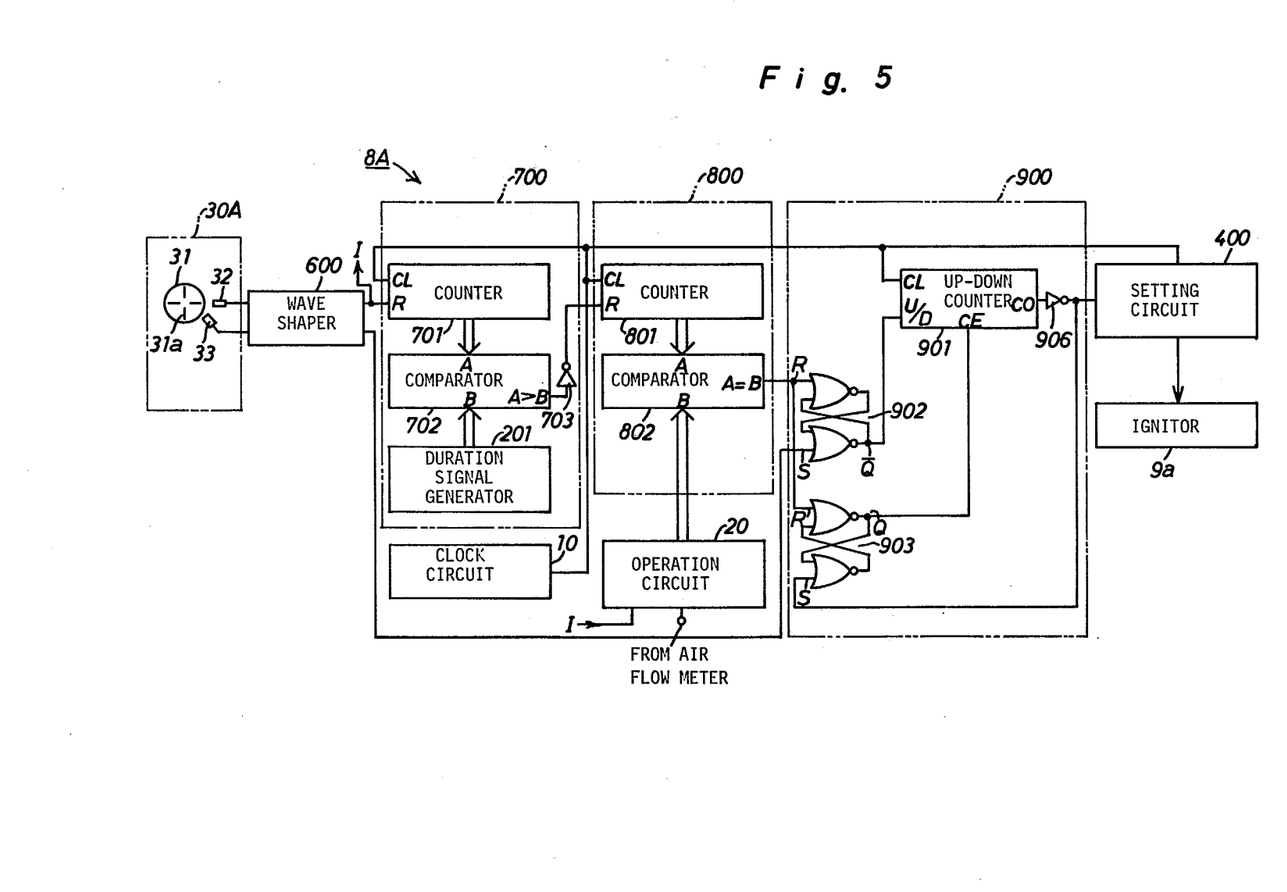
FIG. 5 is a circuit diagram of another embodiment of the ignition control apparatus illustrated in block form in FIG. 2.

FIG. 5 illustrates another embodiment of the ignition control apparatus 8 described hereinafter in detail. The ignition control apparatus 8A comprises a wave shaper 600 for reshaping first and second reference signals from a reference signal generator 30A. The reference signal generator 30A is provided within the distributor 3 in replacement of the reference signal generator 30 previously described. The generator 30A includes the disc 31 and the optical elements 32 of the generator 30 and also includes another optical elements 33. The optical elements 32 are located in optic coupling relationship with the disc 31, as previously described, to detect each slit 31a of the disc 31 at a reference position corresponding with the top dead center position of each piston P. Whereas the optical elements 33 are located in optic coupling relationship with the disc 31 to detect each slit 31a of the disc 31 at a reference position corresponding with a bottom dead center position of the piston P. As the disc 31 rotates, the optical elements 32 generate a first reference signal shown in (a) of FIG. 6 per a half crankshaft rotation at the position corresponding with the top dead center position of the piston P, whereas the optical elements 33 generate a second reference signal shown in (b) of FIG. 6 per a half crankshaft rotation at the position corresponding with the bottom dead center position of the piston P. The wave shaper 600 receives the first and second reference signals from the reference signal generator 30A to generate first and second reshaped pulses therefrom.

The ignition control apparatus 8A further comprises a first delay circuit 700 for driving a second delay circuit 800 with a first predetermined time lag defined by the binary coded signal $\tau_d$ of the duration signal generator 201. The delay circuit 700 comprises a comparator 702 for comparing a counted result of a counter 701 with the binary coded signal $\tau_d$ of the duration signal generator 201. The counter 701 is reset upon receiving at its terminal R the first reshaped pulse from the wave shaper 600 to count the clock pulses from the clock circuit 10. The comparator 702 receives at its terminals A and B the counted result from the counter 701 and the binary coded signal $\tau_d$ from the generator 201 to compare them. While the counted result of the counter 701 is smaller than the binary coded signal $\tau_d$ of the generator 201, the comparator 702 generates at its terminal A>B a low level signal. When the counted result becomes larger than the binary coded signal $\tau_d$ with the first predetermined time lag, the comparator 702 generates at its terminal A>B a high level signal. An inverter 703 receives the low and high level signals from the comparator 702 to generate high and low level signals, as shown in (c) of FIG. 6, for driving the second delay circuit 800 with the first predetermined time lag.

In the ignition control apparatus 8A, a second delay circuit 800 is provided to drive a timing signal generator 900 with a second predetermined time lag defined by the binary coded signal $t_i$ of the operation circuit 20. The delay circuit 800 comprises a comparator 802 for comparing a counted result of a counter 801 with the binary coded signal $t_i$ of the operation circuit 20. The counter 801 is reset upon receiving the high level signal from the inverter 703 and starts to count the clock pulses from the clock circuit 10 at a trailing edge of the high level signal. This means that the counter 801 starts to count the clock pulses with the first predetermined time lag. The comparator 802 receives at its terminals A and B the counted result from the counter 801 and the binary coded signal $t_i$ from the operation circuit 20 to compare them. In this case, the operation circuit 20 receives the electric signal from the air flow meter 2 to generate the binary coded signal $t_i$ in response to the first reshaped pulse from the wave shaper 600. When the counted result of the counter 801 becomes equal to the binary coded signal $t_i$ of the operation circuit 20 with the second predetermined time lag, the comparator 802 generates at its terminal A=B an output pulse, as shown in (d) of FIG. 6, for driving the timing signal generator 900 with the second predetermined time lag.

Figure 6:
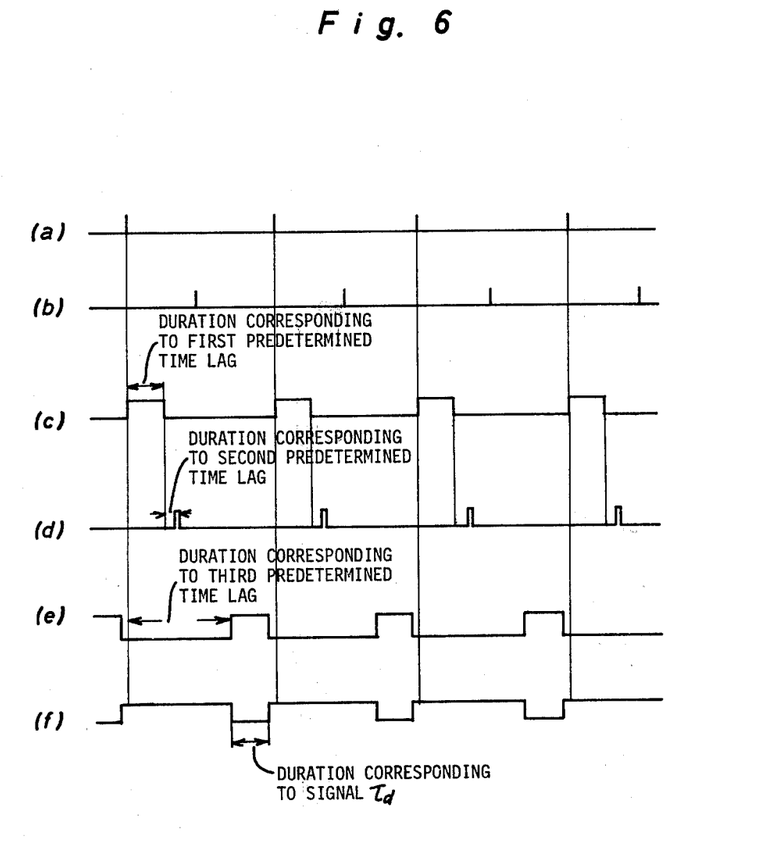
FIG. 6 illustrates waveforms obtained at various points in the control apparatus of FIG. 5.

The timing signal generator 900 functions to generate an output pulse, as shown in (e) of FIG. 6, for driving the setting circuit 400 after generation of the first reference signal with a third predetermined time lag corresponding with a difference between a cycle time of the first reference signal and a total of durations defined by the binary codes signals $\tau_d$ and $t_i$. The generator 900 comprises an up-down counter 901 driven by flip-flops 902 and 903. The flip-flop 902 receives at its terminal R the output pulse from the comparator 802 to generate at its terminal $\overline{Q}$ a reset pulse with the second predetermined time lag. Thereafter, the flip-flop 902 receives at its terminal S the second reshaped pulse from the wave shaper 600 to generate at its terminal $\overline{Q}$ another reset pulse. The counter 901 is reset upon receiving at its terminal U/D the reset pulse from the flip-flop 902 and starts to count up the clock pulses of the clock circuit 10 with the second predetermined time lag. Thereafter, when the counter 901 is reset upon receiving at its terminal U/D another reset pulse from the flip-flop 902, it counts down the counted result thereof up to zero to generate at its terminal CO an output pulse. This means that the counter 901 generates the output pulse after generation of the first reference signal with the third predetermined time lag described above. The output pulse from the counter 901 is inverted by an inverter 906 and then applied to the setting circuit 400 as a timing signal shown in (e) of FIG. 6. The flip-flop 903 functions to receive at its terminal R the output pulse from the comparator 802 so as to generate an output pulse for permitting counting function of the counter 901. The flip-flop 903 also receives at its terminal S the timing signal from the inverter 906 to generate another output pulse for stopping the counting function of the counter 901.

The setting circuit 400 receives the timing signal from the generator 900 to generate a low level signal therefrom, as shown in (f) of FIG. 6. Thereafter, the setting circuit 400 generates a high level signal therefrom with the predetermined first time lag defined by the binary coded signal $\tau_d$. The ignitor 9a receives the low level signal from the setting circuit 400 to energize the primary winding of the ignition coil 9. The ignitor 9a also receives the high level signal from the setting circuit 400 as an ignition timing signal to deenergize the primary winding.

In operation, when one of the pistons P reaches its top dead center position during rotation of the engine E, the reference signal generator 30A produces a first reference signal, as shown in (a) of FIG. 6, which is applied to the wave shaper 600. The first reference signal is reshaped by the wave shaper 600 and then applied as a first reshaped pulse to the first delay circuit 700. Then, the counter 701 in the circuit 700 is reset upon receiving at its terminal R the first reshaped pulse to count the clock pulses from the clock circuit 10. The comparator 702 receives at its terminals A and B a counted result from the counter 701 and the binary coded signal $\tau_d$ from the duration signal generator 201 to compare them. While the counted result of the counter 701 is smaller than the binary coded signal $\tau_d$ of the generator 201, the comparator 702 generate at its terminal A>B a low level signal. When the counted result becomes equal to the binary coded signal $\tau_d$ with the first predetermined time lag, the comparator 702 generates at its terminal A>B a high level signal. The low and high level signals from the comparator 702 are respectively inverted by the inverter 703 and applied to the second delay circuit 800 as high and low level signals, as shown in (c) of FIG. 6.

When the counter 801 in the second delay circuit 800 is reset upon receiving at its terminal R the high level signal from the inverter 703, it is maintained in its reset condition till it receives the low level signal from the inverter 703. Upon receiving the low level signal from the inverter 703 with the first predetermined time lag, the counter 801 is released from its reset condition and starts to count the clock pulses from the clock circuit 10. The comparator 802 receives at its terminals A and B a counted result from the counter 801 and the binary coded signal $t_i$ from the operation circuit 20 to compare them. When the counted result of the counter 801 becomes equal to the binary coded signal $t_i$ of the operation circuit 20 with the second predetermined time lag, the comparator 802 generates at its terminal A=B an output pulse, as shown in (d) of FIG. 6, which is applied to the timing signal generator 900.

When the flip-flops 902 and 903 in the generator 900 receive at their terminals R the output pulse from the comparator 802 with the second predetermined time lag, the flip-flop 902 generates at its terminal $\overline{Q}$ a reset pulse which is applied to the terminal U/D of the up-down counter 901. Simultaneously, the flip-flop 903 generates at its terminal Q an ouput pulse which is applied to the terminal CE of the counter 901. Then, the counter 901 is permitted counting function thereof by the output pulse of the flip-flop 903 and simultaneously reset by the reset pulse of the flip-flop 902 to count up the clock pulses from the clock circuit 10.

In this state, when one of the pistons P reaches its bottom dead center position, the reference signal generator 30A produces a second reference signal, as shown in (b) of FIG. 6, which is applied to the wave shaper 600. The second reference signal is reshaped by the wave shaper 600 and applied to the terminal S of the flip-flop 902. Then, the flip-flop 902 generates at its terminal $\bar{Q}$ another reset pulse which is applied to the terminal U/D of the counter 901. When the counter 901 is again reset by the another reset pulse of the flip-flop 902, it counts down a counted result thereof up to zero to generate at its terminal CO an output pulse. This means that the counter 901 generates the output pulse with the third predetermined time lag after generation of the first reference signal. The output pulse from the counter 901 is inverted by the inverter 906 and applied as a timing signal to the flip-flop 903 and the setting circuit 400. Subsequently, the flip-flop 903 receives at its terminal S the timing signal to generate at its terminal Q another output pulse. The another output pulse is applied to the terminal CE of the counter 901 to stop counting function of the counter 901.

When the setting circuit 400 receives the timing signal from the inverter 906, it generates a low level signal therefrom which is applied to the ignitor 9a. Then, the ignitor 9a energizes the primary winding of the ignition coil 9. Thereafter, when the setting circuit 400 generates a high level signal therefrom with the predetermined first time lag, the high level signal is applied as an ignition timing signal to the ignitor 9a which deenergizes the primary winding.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electronic ignition control apparatus for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of said engine so as to operate said piston, the control apparatus comprising:

a reference signal generator for producing a reference signal corresponding to the top dead center position of said piston;

first means for producing a first digital output signal indicative of the amount of air sucked into said combustion chamber;

second means for producing a second digital output signal indicative of a predetermined period of time necessary for generating the spark voltage in said ignition coil;

third means for producing a third digital output signal indicative of a cycle time of said reference signal in response to a following reference signal;

memory means for storing a data indicating an optimum period of time for spark advance in relation to the amount of sucked air, said memory means being responsive to said reference signal for producinhg a fourth digital output signal indicative of an optimum period of time for spark advance relative to said first output signal;

a calculation circuit for subtracting the period of times defined by said second and fourth output signals from the cycle time defined by said third output signal to produce a fifth digital output signal indicative of a period of time corresponding to a subtracted-resultant value;

fourth means responsive to said reference signal for producing a timing signal in accordance with said fifth output signal; and fifth means responsive to said timing signal for maintaining electric power supply from a source of electricity to the primary winding of said ignition coil within the predetermined period of time defined by said second output signal.

2. An electronic ignition control apparatus as claimed in claim 1, wherein said memory means comprises a read-only memory for storing a data indicating an optimum period of time for spark advance in relation to the amount of sucked air; and a latch circuit connected to said read-only memory for latching a digital signal read out in said read-only memory in response to said reference signal to produce a digital output signal indicative of a period of time for spark advance relative to said first output signal.

3. An electronic ignition control apparatus for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of said engine so as to operate said piston, the control apparatus comprising:

a reference signal generator for producing a reference signal corresponding to the top dead center position of said piston;

first means for producing a first digital output signal indicative of the amount of air sucked into said combustion chamber;

second means for producing a second digital output signal indicative of a predetermined period of time necessary for generating the spark voltage in said ignition coil;

memory means for storing a data indicating an optimum period of time for spark advance in relation to the amount of sucked air, said memory means being responsive to said reference signal for producing a third digital output signal indicative of an optimum period of time for spark advance relative to said first output signal;

a clock circuit for producing clock pulses in a constant frequency;

a first counter circuit responsive to said reference signal for counting the number of clock pulses within a cycle time of said reference signal and producing an output signal indicative of the cycle time in response to a following reference signal from said reference signal generator;

a subtraction circuit for subtracting the predetermined period of time and the optimum period of time for spark advance from the cycle time and producing an output signal indicative of a period of time corresponding to a subtraction-resultant value;

a second counter circuit responsive to said reference signal for counting the number of clock pulses corresponding to said output signal from said substraction circuit to produce a timing signal for supplying electric power from a source of electricity to the primary winding of said ignition coil; and third means responsive to said timing signal for maintaining the electric power supply to the primary winding of said ignition coil within the predetermined period of time defined by said second output signal.

4. An electronic ignition control apparatus as claimed in claim 3, wherein said third means comprises:
- a third counter circuit responsive to said timing signal from said second counter circuit for counting the number of clock pulses;
- a comparator for comparing said second output signal from said second means with the number of clock pulses counted by said third counter circuit to produce an output signal upon coincidence of the number of clock pulses with said second output signal; and
- means for energizing the primary winding of said ignition coil in response to said timing signal from said second counter circuit and deenergizing the primary winding in response to said output signal from said comparator.

5. An electronic ignition control apparatus for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of said engine so as to operate said piston, the control apparatus comprising:
- a reference signal generator for producing first and second reference signals respectively corresponding to the top and bottom dead center positions of said piston;
- first means for producing a first digital output signal indicative of the amount of air sucked into said combustion chamber;
- second means for producing a second digital output signal indicative of a predetermined period of time necessary for generating the spark voltage in said ignition coil;
- memory means for storing a data indicating an optimum period of time for spark advance in relation to the amount of sucked air, said memory means being responsive to said first reference signal for producing a third digital output signal indicative of an optimum period of time for spark advance relative to said first output signal;
- a clock circuit for producing clock pulses in a constant frequency;
- a first counter circuit responsive to said first reference signal for counting the number of clock pulses;
- a first comparator for comparing said second output signal from said second means with the number of clock pulses counted by said first counter circuit to produce an output signal upon coincidence of the number of clock pulses with said second output signal;
- a second counter circuit responsive to the output signal from said first comparator for counting the number of clock pulses;
- a second comparator for comparing said third output signal from said memory means with the number of clock pulses counted by said second counter circuit to produce an output signal upon coincidence of the number of clock pulses with said third output signal;
- an up-down counter circuit responsive to the output signal from said second comparator for counting up the number of clock pulses and subsequently responsive to said second reference signal from said reference signal generator for counting down a previously counted number of clock pulses to produce a timing signal for supplying electric power from a source of electricity to the primary winding of said ignition coil; and
- third means responsive to said timing signal for maintaining the electric power supply to the primary winding of said ignition coil within the predetermined period of time defined by said second output signal.

6. An electronic ignition control apparatus as claimed in claim 5, wherein said third means comprises:
- a third counter circuit responsive to said timing signal from said up-down counter circuit for counting the number of clock pulses;
- a third comparator for comparing said second output signal from said second means with the number of clock pulses counted by said third counter circuit to produce an output signal upon coincidence of the number of clock pulses with said second output signal; and
- means for energizing the primary winding of said ignition coil in response to said timing signal from said up-down counter circuit and deenergizing the primary winding in response to said output signal from said third comparator.

7. An electronic ignition control method for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of said engine so as to operate said piston, the method comprising the steps of
- a. producing a reference signal corresponding to the top dead center position of said piston;
- b. producing a first digital output signal indicative of the amount of air sucked into said combustion chamber;
- c. producing a second digital output signal indicative of a predetermined period of time necessary for generating the spark voltage in said ignition coil;
- d. producing clock pulses in a constant frequency;
- e. storing a data indicating an optimum period of time for spark advance in relation to the amount of sucked air to produce a third digital output signal indicative of a period of time for spark advance relative to said first output signal upon receiving said reference signal;
- f. counting the number of clock pulses within a cycle time of said reference signal to produce a fourth digital output signal indicative of the cycle time in response to a following reference signal;
- g. subtracting the period of times represented by said second and third output signals from the cycle time represented by said fourth output signal to produce a fifth digital output signal indicative of a period of time corresponding to a subtraction-resultant value;
- h. counting the number of clock pulses corresponding to said fifth output signal to produce a timing signal for supplying electric power from a source of electricity to the primary winding of said ignition coil; and
- i. energizing the primary winding of said ignition coil in response to said timing signal to maintain the energization of the primary winding within the predetermined period of time represented by said second output signal.

8. An electronic ignition control method for an internal combustion engine having an output shaft rotated by a piston, an ignition coil adapted to generate a spark voltage upon deenergization of the primary winding thereof and a spark plug activated by the spark voltage to ignite the air-fuel mixture metered into a combustion chamber of said engine so as to operate said piston, the method comprising the steps of a. producing first and second reference signals respectively corresponding to the top and bottom dead center positions of said piston;

b. producing a first digital output signal indicative of the amount of air sucked into said combustion chamber;

c. producing a second digital output signal indicative of a predetermined period of time necessary for generating the spark voltage in said ignition coil;

d. producing clock pulses in a constant frequency;

e. storing a data indicating an optimum period of time for spark advance in relation to the amount of sucked air to produce a third digital output signal indicative of a period of time for spark advance relative to said first output signal upon receiving said reference signal;

f. counting the number of clock pulses corresponding to said second output signal in response to said first reference signal to produce a fourth digital output signal indicative of the counted number of clock pulses;

g. counting the number of clock pulses corresponding to said third output signal in response to said fourth output signal to produce a fifth digital output signal indicative of the counted number of clock pluses;

h. counting up the number of clock pulses in response to said fifth output signal and subsequently counting down a previously counted number of clock pulses in response to said second reference signal to produce a timing signal for supplying electric power from a source of electricity to the primary winding of said ignition coil; and i. energizing the primary winding of said ignition coil in response to said timing signal to maintain the energization of the primary winding within the predetermined period of time represented by said second output signal.

* * * * *